(12) United States Patent
Dunkel

(10) Patent No.: US 7,896,432 B2
(45) Date of Patent: Mar. 1, 2011

(54) MULTI PURPOSE VEHICLE FURNITURE SYSTEM

(76) Inventor: Peter L. Dunkel, Newport Beach, CA (US)

( * ) Notice: Subject to any disclaimer, the term of this patent is extended or adjusted under 35 U.S.C. 154(b) by 228 days.

(21) Appl. No.: 12/349,429

(22) Filed: Jan. 6, 2009

(65) Prior Publication Data

US 2010/0171344 A1   Jul. 8, 2010

(51) Int. Cl.
*A47B 85/04* (2006.01)
*B60N 2/32* (2006.01)

(52) U.S. Cl. .......................... 297/124; 297/125; 297/67

(58) Field of Classification Search ............. 297/157.1, 297/174 R, 118, 119, 67; 296/65.05, 65.09, 296/65.16; 108/44, 11, 6, 144.11
See application file for complete search history.

(56) References Cited

U.S. PATENT DOCUMENTS

| | | | | |
|---|---|---|---|---|
| 2,758,633 A | * | 8/1956 | Apple | 297/124 |
| 2,842,185 A | * | 7/1958 | Fortine | 297/124 |
| 2,882,957 A | * | 4/1959 | Anderson | 297/124 |
| 4,606,575 A | * | 8/1986 | Kodet | 297/124 |
| 5,088,135 A | * | 2/1992 | Violette | 5/2.1 |
| 5,704,683 A | * | 1/1998 | Cooper et al. | 297/124 |
| 6,113,182 A | * | 9/2000 | Wise | 297/119 |
| 7,399,031 B2 | * | 7/2008 | Gardner | 297/118 |

* cited by examiner

*Primary Examiner*—Sarah B McPartlin
(74) *Attorney, Agent, or Firm*—Stetina Brunda Garred & Brucker

(57) ABSTRACT

A vehicle furniture system for use proximate to a vehicle driver's seat, the system comprising: a first post having a first post first end, a first post body, and a first post second end mountable to the floor of the vehicle; a primary support having a primary support longitudinal axis generally perpendicular to a primary support lateral axis, a primary support top surface, a primary support bottom surface, a primary support first longitudinal side rotatably and slidably engageable to the first post, a primary support second longitudinal side, a primary support first lateral side, and a primary support second lateral side, the primary support disposable in a first position, a second position, a third position, and a fourth position; a primary support rod; and a second support adjacent to the primary support with the primary support in the second position and the third position.

20 Claims, 5 Drawing Sheets

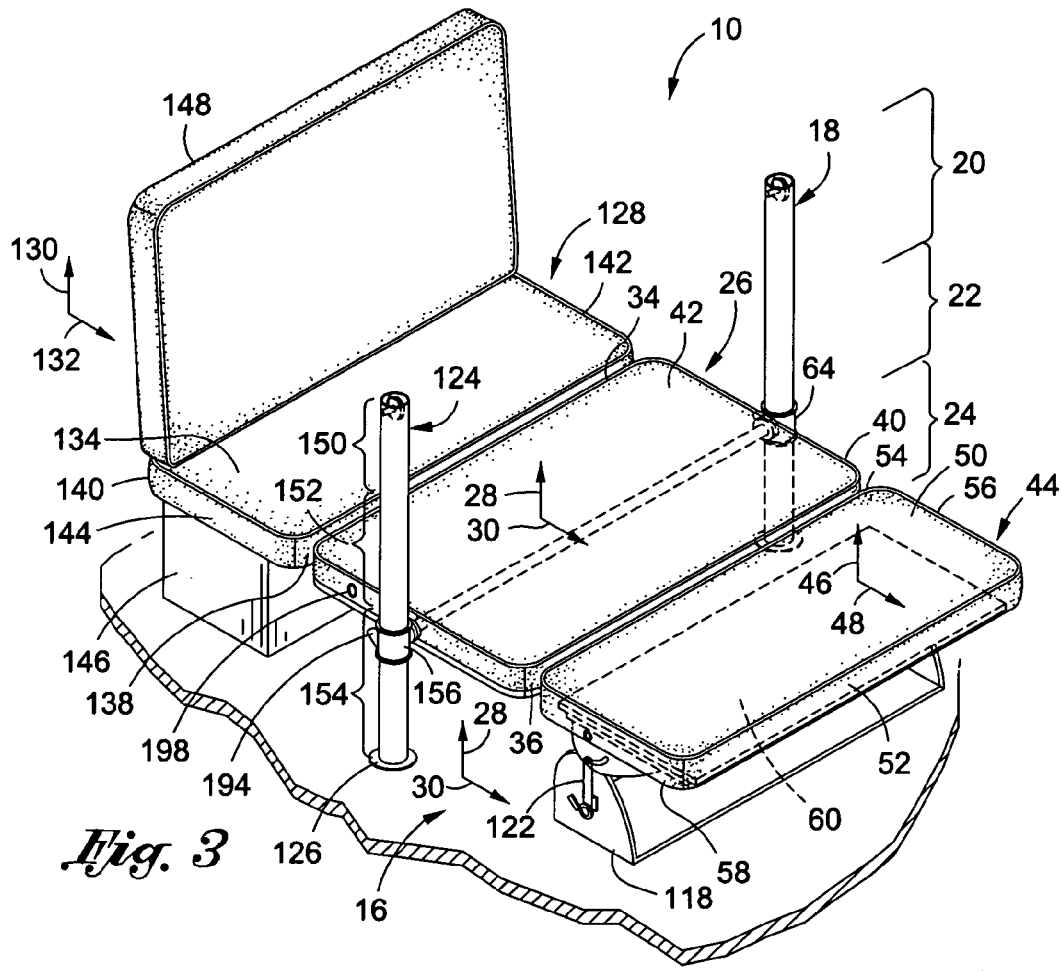
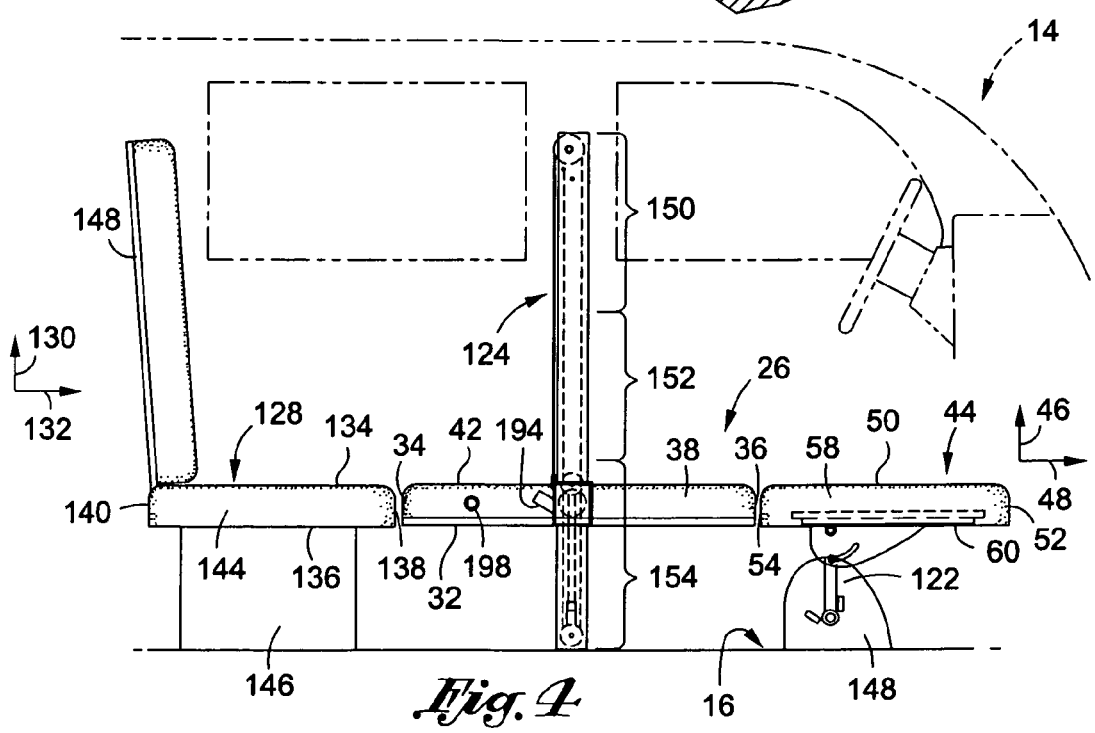

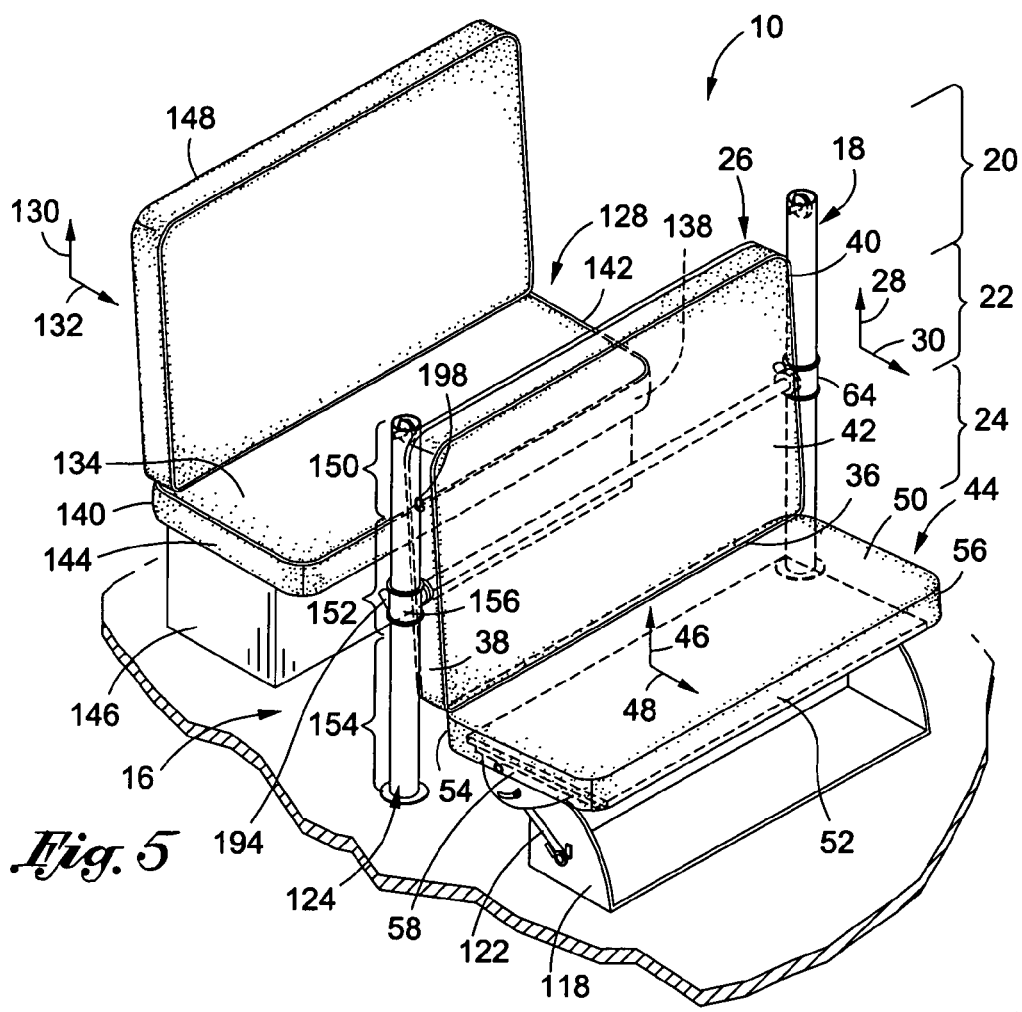
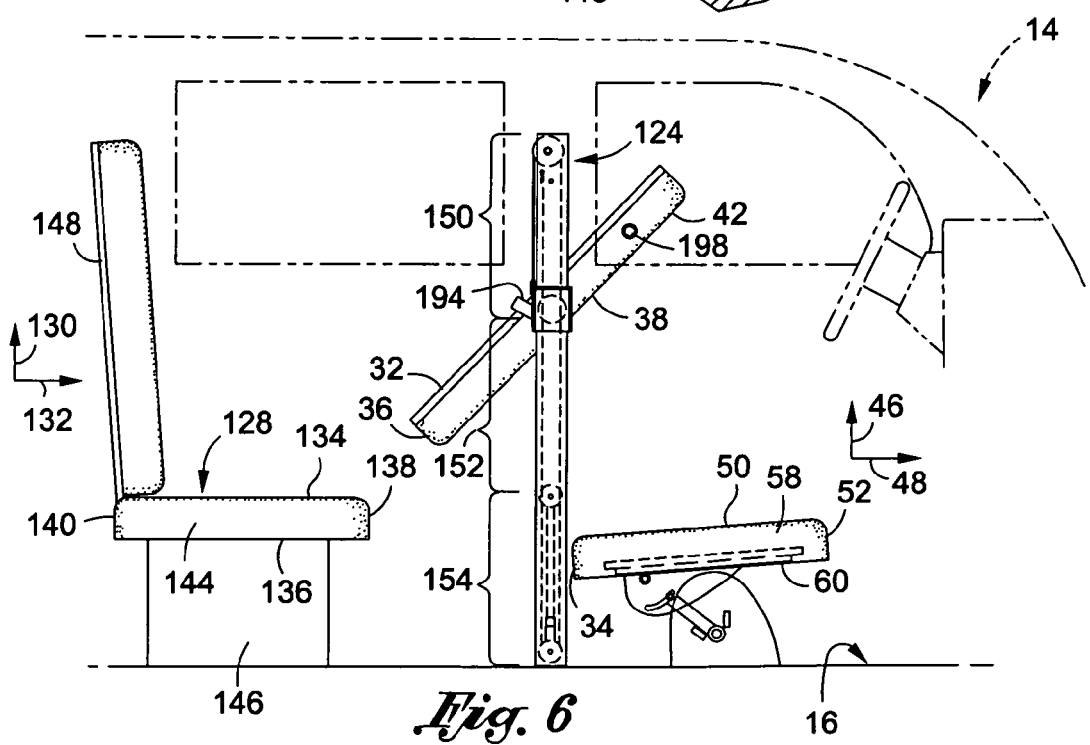

MULTI PURPOSE VEHICLE FURNITURE SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to a multi-purpose vehicle furniture system for use proximate to a driver's seat in most transport vehicles, such as a commercial cargo truck or pick-up truck.

Recreational vehicles and trailers are known to have fixtures for comfortably sleeping, seating, and providing an eating area for its passengers. Commercial cargo trucks and pick-up trucks on the other hand, due to space constraints, have far fewer options in providing their passengers with dining, seating and bedding accommodations. Commercial cargo trucks may provide for a small sleeping quarters above the cab. However, this "overhang" space is typically far too small to accommodate a table for dining or a chair for sitting.

Drivers of pick-up trucks or commercial cargo trucks are often forced to interrupt lengthy road trips to satisfy basic needs of sleep, eating, and rest. Typically, drivers of such vehicles in need of sleep would need to search for hotel accommodations. Likewise, these drivers desiring to sit down for a meal would need to interrupt their trips to find a restaurant. Clearly, these interruptions can add up over the course of a trip, both in terms of the costs associated with paying for a hotel or purchasing restaurant food, as well as the time lost in searching for such accommodations. However, due to the limited space available in the area proximate to the driving quarters of a pick-up or a commercial cargo truck, these drivers and/or passengers have been traditionally left with no other option. Due to ever increasing fuel prices, commercial truck drivers may be particularly concerned about time lost and additional expenses incurred over the course of a trip. In order to avoid such costs, some commercial truck drivers may unknowingly increase the risks of having an accident during their trip by foregoing their need for sleep and/or food in order to reduce their expenses. These drivers cannot simply pull over to the side of the road to eat and sleep in comfort. Under these circumstances, these drivers inevitably decrease their productivity and the time efficiency lost looking for an opportunity to eat or sleep comfortably. Although a recreational vehicle typically has separate furniture pieces for eating, sleeping, and sitting comfortably, its excessive size and weight may have many draw backs. Obviously, the weight of a recreational vehicle results in a greatly diminished fuel efficiency, thereby adding to fuel costs. Also, the comfortable accommodations offered by a recreational vehicle may come with an expensive price tag. Often, the process of converting the "dining" area of a recreational vehicle to a bed can be time-consuming and cumbersome, requiring the involvement of more than one individual to assemble. On the other hand, a commercial truck or pick-up truck simply does not have enough space to install separate fixtures for eating, sleeping, and sitting.

Accordingly, there appears to be a need in the art for a new multi purpose vehicle furniture system for use in a commercial cargo truck and/or pick-up proximate to the driver's seat.

SUMMARY OF THE INVENTION

According to an aspect of the present invention, there is provided a multi-purpose vehicle furniture system for use proximate to a driver's seat in a vehicle, the vehicle having a floor. The multi purpose vehicle furniture system may include a first post. The first post may have a first post first end, a first post body, and a first post second end sized and configured to be mountable to the floor. The first post body may be disposed between the first post first end and the first post second end. The vehicle furniture system may also include a primary support defining a primary support longitudinal axis and a primary support lateral axis. The primary support lateral axis may be disposed perpendicular to the primary support longitudinal axis. The primary support may have a primary support top surface and an opposing primary support bottom surface. The primary support may further have a primary support first longitudinal side and an opposing primary support second longitudinal side. The primary support may also have a primary support first lateral side and an opposing primary support second lateral side. The primary support first lateral side and the primary support second lateral side may be disposed generally between the primary support first longitudinal side and the primary support second longitudinal side. Each of the primary support first longitudinal side, the primary support second longitudinal side, the primary support first lateral side, and the primary support second lateral side may be disposed between the primary support top surface and the primary support bottom surface. The primary support first longitudinal side may be rotatably and slidably engaged to the first post. The primary support may be disposable in a first position proximate to the first post first end with the primary support top surface facing away from the floor. The primary support may be disposable in a second position proximate to the first post second end with the primary support bottom surface facing away from the floor. The primary support may be disposable in a third position proximate to the first post body with the primary support bottom surface orthogonal to the floor or at an angle greater than 0 degrees to the floor. The primary support may be disposable in a fourth position proximate to the first post first end with the primary support top surface orthogonal to the floor or facing away from the floor at an angle greater than 0 degrees but less than 90 degrees to the floor.

The vehicle furniture system may further include a primary support rod disposable proximate to the primary support and engageable with the first post. The primary support may be axially rotatable about the primary support rod. The vehicle furniture system may further include a second support mountable to the floor. The second support may define a second support longitudinal axis and a second support lateral axis disposed perpendicular to the second support longitudinal axis. The second support may have a second support top surface and an opposing second support bottom surface. The second support may further have a second support first longitudinal side and an opposing second support second longitudinal side. The second support may also have a second support first lateral side and an opposing second support second lateral side. The second support first lateral side and the second support second lateral side may be disposed generally between the second support first longitudinal side and the second support second longitudinal side. Each of the second support first longitudinal side, the second support second longitudinal side, the second support first lateral side, and the second support second lateral side may be disposed between the second support top surface and the second support bottom surface. The second support second longitudinal side may be generally coplanar and adjacent to the primary support second longitudinal side with the primary support in the second position. The second support may be adjacent to the primary support with the primary support in the third position.

The multi purpose vehicle furniture system is innovative in that it is able to provide sitting, eating, and sleeping accommodations within the space constraints of the area proximate to a drivers seat of a commercial cargo truck or pick-up. The primary support may be conveniently converted between various positions as it is rotatably and slidably disposed to the first post. For example, in the first position, the primary support may be used as a table top for dining, reading, playing cards, reviewing a map or other activity requiring an elevated support surface. The second support may serve as a seating area or chair adjacent to the primary support, allowing the user to sit comfortably while next to the primary support. This feature enables the driver of a commercial cargo truck or pick-up truck on a lengthy trip to not have to sacrifice added time and expense searching for and spending time in a restaurant to have a comfortable sit-down meal. With the vehicle furniture system, the driver need only pull their vehicle to the side of the road to then enjoy a meal on the primary support top surface. With the primary support in the second position, the multi-purpose vehicle furniture system may be used as a bed, with the primary support and the second support being generally coplanar with each other. With this feature, the driver again need not incur the added time and expense of looking for and spending time in a hotel room in which they may comfortably sleep. The primary support may be readily rotated axially about the primary support rod and slidably engaged from the first post first end to the first post second end in converting the vehicle furniture system from the first position to the second position. As such, the vehicle furniture system may be conveniently modified from the table top mode to a bed mode, without great effort. In the third position, the primary support may be readily converted into a back rest for the second support, thereby providing an additional comfortable seating area proximate to the driver's seat. The primary support may be readily rotated axially about the primary support rod and slidably engaged from the first post second end to the first post body in converting the vehicle furniture system from the second position to the third position. The primary support may be readily rotated axially about the primary support rod and slidably engaged from the first post body to the first post first end in converting the vehicle furniture system from the third position to the fourth position. In the fourth position, the primary support may function as an angled table top, enabling the driver to engage in drawing activities or advanced map plotting to conveniently chart the course of a trip. Because the vehicle furniture system may be readily converted between the first, second, third, and fourth positions, its eating, sitting, and sleeping functions can be conveniently deployed by a single driver without the need for assistance by a companion. The time spent converting the vehicle furniture system between these various positions may be significantly less than would be spent searching for a hotel or restaurant for sleeping and eating accommodations.

The prior art vehicle furniture systems appear to be intended for recreational vehicles where there is abundant space for separate furniture fixtures for each of eating, sleeping, and sitting functions. Accordingly, these prior art systems are not suitable in the space constrained area proximate to the driver's seat in a commercial cargo truck or a pick-up truck. None of these prior art vehicle furniture systems appear to utilize a primary support that is rotatably and slidably engaged to a first post. Nor do these prior art vehicle furniture systems appear to be capable of assuming different positions based on the angle of rotation between the primary support top surface or the primary support bottom surface and the floor. These prior art vehicle furniture systems appear to be bulkier both in size and weight as compared with the multi-purpose vehicle furniture system. As such, the added weight of these prior art vehicle furniture systems results in a diminished fuel efficiency, thereby adding to fuel costs. Also, due to their added size, these prior art vehicle furniture systems result in greater material costs. The prior art vehicle furniture systems also appear to be more difficult to install, due to their apparent use of bulky and/or cumbersome parts, thereby potentially necessitating the driver to receive assistance in their installation.

According to another embodiment of the present invention, the primary support may be substantially parallel to the floor in the first position.

In another embodiment, the vehicle furniture system further includes a first post floor mount operative to mount the first post to the floor.

In yet a further embodiment, the vehicle furniture system further includes a first post mount. In this embodiment, the primary support second lateral side may be rotatably engageable to the first post by the first post mount. The first post mount may further have a first post collar disposable around the first post, a first post collar bracket proximate to the first post collar having a first post collar bracket aperture, a first post primary ring disposable adjacent to the primary support second lateral side having a first post primary ring aperture, and a first post secondary ring opposing the first post primary ring disposable against the first post collar bracket having a first post secondary ring aperture. The primary support rod may be disposable through the first post primary ring aperture and the first post secondary ring aperture. The primary support rod may be further engageable and axially rotatable in the first post collar bracket aperture.

This feature of the vehicle furniture system is innovative in that it enables the primary support to be axially rotatable about the primary support rod, thereby enabling the primary support to be conveniently converted from the first, second, third, and fourth positions, as the angle between the primary support top surface or the primary support bottom surface and the floor is modified.

According to another embodiment, the vehicle furniture system may further include a first post positioning pin disposable through a first post primary ring slot on the first post primary ring. The first post positioning pin may be further engageable with one of a plurality of first post secondary ring slots on the first post secondary ring. The primary support may be axially rotatable about the primary support rod and engageable in the first position with the first post positioning pin being disposable through the first post primary ring slot and engageable with a first post secondary ring first slot. The primary support may be axially rotatable about the primary support rod and engageable in the second position with the first post positioning pin being disposable through the first post primary ring slot and engageable with a first post secondary ring second slot. The primary support may be axially rotatable about the primary support rod and engageable in the third position with the first post positioning pin being disposable in the first post primary ring slot and a first post secondary ring third slot. The primary support may be axially rotatable about the primary support rod and engageable in the fourth position with the first post positioning pin being disposable in the first post primary ring slot and engageable with a first post secondary ring fourth slot.

In another embodiment, the vehicle furniture system may further include a first post positioning pin cable. The first post positioning pin cable may have a first post positioning pin cable first end and a first post positioning pin cable second end. The first post positioning pin cable first end may be engageable to the first post positioning pin. The first post positioning pin cable second end may be engageable to a positioning button disposable on the primary support. The first post positioning pin cable may release the first post positioning pin through the first post primary ring slot and engage one of the plurality of first post secondary ring slots when the positioning button is released. The first post positioning pin cable may retract the first post positioning pin from the first post primary ring slot and one of the plurality of first post secondary ring slots when the positioning button is depressed.

This feature of the vehicle furniture system is innovative in that it enables the primary support to be axially rotatable about the primary support rod and readily engageable into one of the first position, the second position, the third position, or the fourth position. This in turn allows the vehicle furniture system to be conveniently and efficiently converted into and between the table top, bed, or seat modes. As a result, the vehicle furniture system can be assembled into its various positions by a single user, without the need for assistance from others.

According to other embodiments, the vehicle furniture system may further include a first post assembly. The first post assembly may include a first post assembly having a first post cable operative to slidably move the primary support along a first post axis of the first post, a first post pulley proximate to the first post first end, and a first post secondary pulley proximate to the first post second end. The first post cable may be disposable around the first post primary pulley and the first post secondary pulley. The first post cable may have a first post cable first end engageable to the first post collar through a first post first end aperture on the first post first end. The first post cable may further have a first post cable second end disposable on the first post primary pulley. The first post assembly may further include a first post suspension having a first post suspension first end and a first post suspension second end operative to position the primary support along the first post axis. The first post suspension first end may be engageable with the first post primary pulley. The first post suspension second end may be engageable with the first post secondary pulley.

In another embodiment, the vehicle furniture system may also include a first post locking pin mountable to the first post collar operative to lock the position of the primary support along the first post axis of the first post. The vehicle furniture system may also include a first post cable first end collar lock operative to engage the first post cable first end to the first post collar.

In another embodiment, the primary support bottom surface may be covered by a padded material. The primary support top surface may also be covered by a hard material.

In yet another embodiment, the second support may be mountable to the floor by a second support floor mount. The second support floor mount may have a swivel arm operative to position the second support.

In another embodiment, the vehicle furniture system may further include a second post. The second post may have a second post first end, a second post body, and a second post second end sized and configured to be mountable to the floor. The second post body may be disposed between the second post first end and the second post second end. In one embodiment, the second post may be mountable to the floor by a second post floor mount.

In another embodiment, the vehicle furniture system may further include a second post mount. In this embodiment, the primary support first lateral side may be rotatably engageable to the second post by the second post mount. The second post mount may have a second post collar disposable around the second post, a second post collar bracket proximate to the second post collar having a second post collar bracket aperture, a second post primary ring disposable adjacent to the primary support first lateral side having a second post primary ring aperture, and a second post secondary ring opposing the second post primary ring disposable against the second post collar bracket having a second post secondary ring aperture. The primary support rod may be disposable through the second post primary ring aperture and the second post secondary ring aperture. The primary support rod may be further engageable and axially rotatable in the second post collar bracket aperture.

In another embodiment, the vehicle furniture system may further include a second post positioning pin disposable through a second post primary ring slot on the second post primary ring. The second post positioning pin may be further engageable with one of a plurality of second post secondary ring slots on the second post secondary ring. The primary support may be axially rotatable about the primary support rod and engageable in the first position with the second post positioning pin being disposable through the second post primary ring slot and engageable with a second post secondary ring first slot. The primary support may be axially rotatable about the primary support rod and engageable in the second position with the second post positioning pin being disposable through the second post primary ring slot and engageable with a second post secondary ring second slot. The primary support may be axially rotatable about the primary support rod in the third position with the second post positioning pin being disposable through the second post primary ring slot and engageable with a second post secondary ring third slot. The primary support may be axially rotatable about the primary support rod and engageable in the fourth position with the second post positioning pin being disposable through the second post primary ring slot and engageable with a second post secondary ring fourth slot.

In yet another embodiment, the vehicle furniture system may further include a second post assembly. The second post assembly may have a second post cable operative to slidably move the primary support along a second post axis of the second post, a second post primary pulley proximate to the second post first end, and a second post secondary pulley proximate to the second post second end. The second post cable may be disposable around the second post primary pulley and the second post secondary pulley. The second post cable may have a second post cable first end engageable to the second post collar through a second post first end aperture on the second post first end. The second post cable may further have a second post cable second end disposable on the second post primary pulley. The second post assembly may further include a second post suspension having a second post suspension first end and a second post suspension second end operative to position the primary support along the second post axis. The second post suspension first end may be engageable with the second post primary pulley. The second post suspension second end may be engageable with the second post secondary pulley.

In another embodiment, a second post locking pin may be mountable to the second post collar operative to lock the position of the primary support along the second post axis of the second post. A second post cable first end collar lock may be operative to engage the second post cable first end to the second post collar.

In another embodiment, the vehicle furniture system may also include a third support mountable to the floor defining a third support longitudinal axis and a third support lateral axis disposed perpendicular to the third support longitudinal axis. The third support may have a third support top surface and an opposing third support bottom surface. The third support may also have a third support first longitudinal side and an opposing third support second longitudinal side. The third support may also have a third support first lateral side and an opposing third support second lateral side. The third support first lateral side and third support second lateral side may be disposed generally between the third support first longitudinal side and the third support second longitudinal side. Each of the third support first longitudinal side, the third support second longitudinal side, the third support first lateral side, and the third support second lateral side may be disposed between the third support top surface and the third support bottom surface. The third support first longitudinal side may be generally coplanar and adjacent to the primary support first longitudinal side with the primary support in the second position.

In another embodiment, the third support may be mounted to the floor by a third support floor mount. The vehicle furniture system may further include a third support back rest disposable to the third support. The third support back rest may be generally perpendicular to the third support. In one embodiment, the third support and the third support back rest may be connectable by a hinge operative to make the third support and the third support back rest foldable.

BRIEF DESCRIPTION OF THE DRAWINGS

These and other features are advantages of the various embodiments disclosed herein that will be better understood with respect to the following description and drawings, in which like number refer to like parts throughout, and in which:

FIG. 3 is a perspective view of an embodiment of the multi purpose vehicle furniture system with the primary support rotatably and slidably engaged to the first post and the second post in the second position, coplanar with the second support and the third support.

FIG. 4 is a side view of an embodiment of the multi purpose vehicle furniture system with the primary support rotatably and slidably engaged to the first post and the second post in the second position proximate to the drivers seat of a vehicle, coplanar with the second support and the third support.

FIG. 5 is a perspective view of an embodiment of the multi purpose vehicle furniture system with the primary support rotatably and slidably engaged to the first post and the second post in the third position, approximately perpendicular to the second support.

FIG. 6 is a side view of an embodiment of the multi purpose vehicle furniture system with the primary support rotatably and slidably engaged to the first post and the second post in the fourth position proximate to the driver's seat of a vehicle.

DETAILED DESCRIPTION

The drawings referred to herein are for the purposes of illustrating the preferred embodiments of the present invention and not for the purposes of limiting the same.

Figure 1:
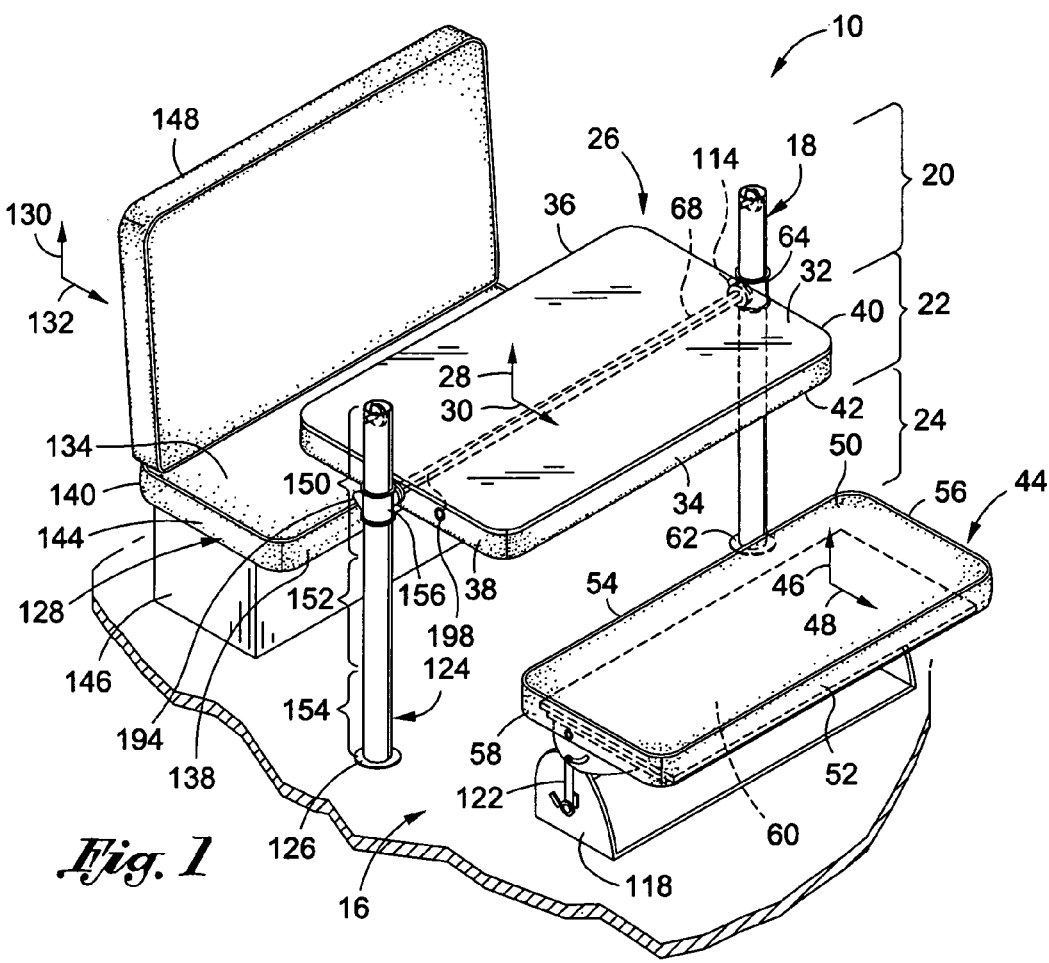
FIG. 1 is a perspective view of an embodiment of a multi purpose vehicle furniture system with the primary support rotatably and slidably engaged to the first post and the second post in the first position, adjacent to the second support and the third support.

FIG. 1 is an embodiment of a multi-purpose vehicle furniture system 10 mountable to a floor 16 of a vehicle 14. A primary support 26 may be rotatably and slidably engaged to a first post 18. The primary support 26 may define a primary support longitudinal axis 28 and a primary support lateral axis 30 disposed perpendicular to the primary support longitudinal axis 28. The primary support 26 may have a primary support top surface 32 and an opposing primary support bottom surface 42. The primary support 26 may also have a primary support first longitudinal side 34, a primary support second longitudinal side 36, a primary support first lateral side 38, and a primary support second lateral side 40. The primary support first lateral side 38 and the primary support second lateral side 40 may be disposed generally between the primary support first longitudinal side 34 and the primary support second longitudinal side 36. Each of the primary support first longitudinal side 34, the primary support second longitudinal side 36, the primary support first lateral side 38, and the primary support second lateral side 40 may be disposed between the primary support top surface 32 and the primary support bottom surface 42. The first post 18 may have a first post first end 20, a first post body 22, and a first post second end 24. The first post second end 24 may be mountable to the floor 16. The first post body 22 may be disposed between the first post first end 20 and the first post second end 24. Although the embodiment in FIG. 1 depicts the first post 18 as being cylindrical in shape, as used herein, the first post 18 and second post 124 described herein may assume any shape, including a rectangular configuration, for example. The vehicle furniture system 10 may also include a primary support rod 68 disposed proximate to the primary support 26 and engageable with the first post 18 at the primary support second lateral side 40. In another embodiment, the primary support 26 may be engageable with a second post 124 at the primary support first lateral side 38. In the embodiment in FIG. 1, the primary support rod 68 extends from the primary support first lateral side 38 to the primary support second lateral side 40 beneath the primary support top surface 32. The primary support 26 may be axially rotatable about the primary support rod 68. Discussed in detail below, this novel feature allows the primary support 26 to be readily positioned into varying configurations that allow for use as a table top, bed, or a seat.

The embodiment in FIG. 1 also depicts a second support 44 mountable to the floor 16. The second support 44 may define a second support longitudinal axis 46 and a second support lateral axis 48 disposed perpendicular to the second support longitudinal axis 46. The second support 44 may have a second support top surface 50 and an opposing second support bottom surface 60. The second support 44 may have a second support first longitudinal side 52 and an opposing second support second longitudinal side 54. The second support may also have a second support first lateral side 56 and an opposing second support second lateral side 58. The second support first lateral side 56 and the second support second lateral side 58 may be disposed generally between the second support first longitudinal side 52 and the second support second longitudinal side 54. Each of the second support first longitudinal side 52, the second support second longitudinal side 54, the second support first lateral side 56, and the second support second lateral side may be disposed between the second support top surface 50 and the second support bottom surface 60. In the embodiment depicted in FIG. 1, the second support 44 may be mountable to the floor 16 by a second support floor mount 118. The second support floor mount 118 may include a swivel arm 122 to enable the forward and rearward adjustment of the second support 44 in relation to the primary support 26 along the second support longitudinal axis 46 and the second support lateral axis 48.

The vehicle furniture system 10 may further include a third support 128 mountable to the floor 16. The third support 128 depicted in FIG. 1 may define a third support longitudinal axis 130 and a third support lateral axis 132 disposed perpendicular to the third support longitudinal axis 130. The third support 128 may have a third support top surface 134 and an opposing third support bottom surface 136, a third support first longitudinal side 138, and a third support second longitudinal side 140 opposing the third support first longitudinal side 138. The third support 128 may further have a first lateral side 142 and an opposing third support second lateral side 144. The third support first lateral side 142 and the third support second lateral side 144 may be disposed generally between the third support first longitudinal side 138 and the third support second longitudinal side 140. Each of the third support first longitudinal side 138, the third support second longitudinal side 140, the third support first lateral side 142, and the third support second lateral side 144 may be disposed between the third support top surface 134 and the third support bottom surface 136. In another embodiment, the third support 128 may be mountable to the floor 16 by a third support floor mount 146. The vehicle furniture system 10 may further include a third support back rest 148 disposable proximate to the third support 128. The third support back rest 148 may be generally perpendicular to the third support 128. In another embodiment, the third support 128 and the third support back rest 148 may be connectable by a hinge 230. In this configuration, the third support 128 and the third support back rest 148 may be foldable.

As used herein, the term "transport vehicle" 14 refers to a vehicle with an area proximate to a driver's seat having dimensions adequate to install the vehicle furniture system 10. Examples of transport vehicles 10 may include but are not limited to commercial cargo trucks or pick-up trucks.

As used herein, the term "first position" refers to the primary support 26 disposable in a table top mode proximate to the first post first end 20 on the first post 18. The primary support top surface 32 may be facing away from the floor 16 in this configuration. In one embodiment of the invention, the primary support 26 may be substantially parallel to the floor 16 in this configuration. In the embodiment depicted in FIG. 1, the primary support 26 may also be disposed proximate to the second post first end 150 on the second post 124.

As used herein, the term "second position" refers to the primary support 26 disposable in a bed mode proximate to the first post second end 24 on the first post 18. The second support second longitudinal side 54 of the second support 44 is generally coplanar and adjacent to the primary support second longitudinal side 36 in this configuration. The third support first longitudinal side 138 of the third support 128 may be generally coplanar and adjacent to the primary support first longitudinal side 34. The primary support bottom surface 42 may be facing away from the floor 16 in this configuration. In one embodiment of the invention, the primary support 26, the second support 44, and the third support 128 may be substantially parallel to the floor 16 in this configuration. In one embodiment of the invention, as depicted in FIG. 3, the primary support 26 may be also disposed proximate to the second post second end 154 on the second post 124.

As used herein, the term "third position" refers to the primary support 26 disposable in a seat mode proximate to the first post body 22 on the first post 18, with the primary support bottom surface 42 orthogonal to the floor or at an angle greater than 0 degrees but less than 180 degrees to the floor 16. In one embodiment of the invention as depicted in FIG. 5, the primary support 26 is substantially perpendicular to both the second support 44 and the floor 16. In the embodiment depicted in FIG. 5, the primary support 26 may also be disposed proximate to the second post body 152 on the second post 124.

As used herein, the term "fourth position" refers to the primary support 26 disposable proximate to the first post first end 20 with the primary support top surface 32 orthogonal to or facing away from the floor 16 at an angle greater than 0 degrees but less than 90 degrees to the floor 16. In one embodiment of the invention, as depicted in FIG. 6, the angle between the primary support top surface 32 and the floor 16 is approximately 45 degrees.

Figure 2:
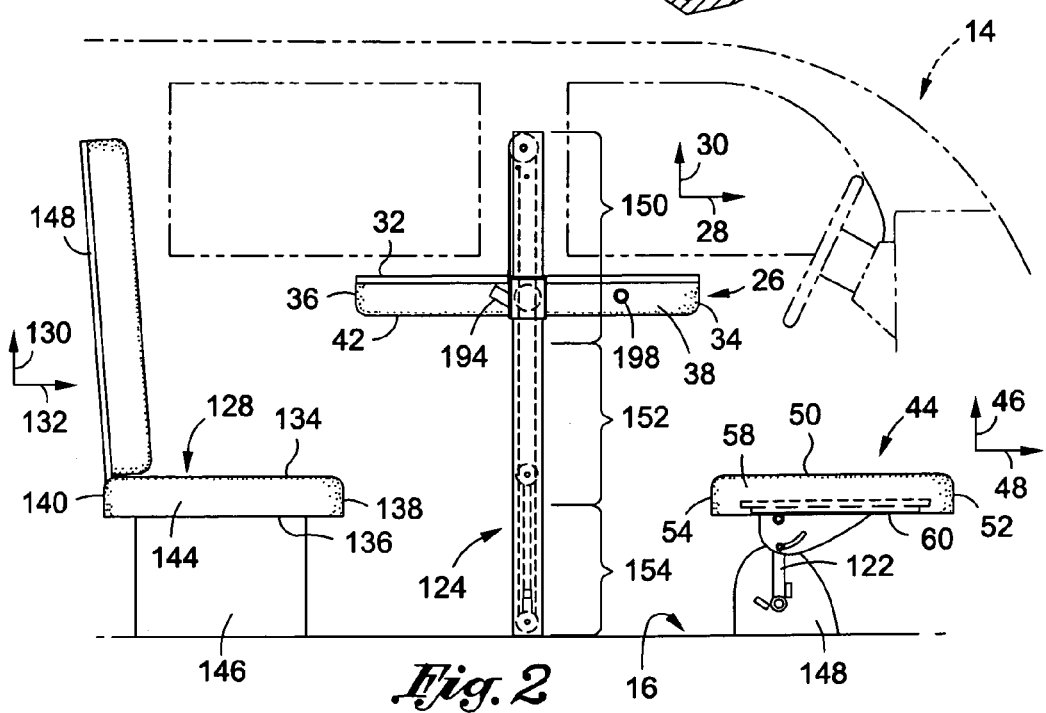
FIG. 2 is a side view of an embodiment of the multi purpose vehicle furniture system with the primary support rotatably and slidably engaged to the first post and the second post in the first position proximate to the driver's seat of a vehicle, adjacent to the second support and the third support.

As used herein, the term "primary support top surface facing away from the floor" refers to the whole primary support top surface 32 being generally further from the floor 16 than the whole primary support bottom surface 42, with the primary support 26 being substantially parallel to or at a slight angle with the floor 16. In one embodiment of the invention, as depicted in FIG. 2, the primary support 26 is parallel to the floor 16. However, in other embodiments, where the primary support 26 is at a slight angle to the floor 16 in the first position, while there may be some short portions of the primary support 26 where the primary support bottom surface 42 may be further from the floor 16 than the primary support top surface 42, the overall aggregate of the distance of the whole primary support top surface 32 from the floor 16 will be further from the floor 16 than the overall aggregate distance of the primary support bottom surface 42 from the floor 16 in the first position.

As used herein, the term "primary support bottom surface facing away from the floor" refers to the whole primary support bottom surface 42 being further from the floor 16 than the whole primary support top surface 32, with the primary support 26 being substantially parallel to or at a slight angle with the floor 16. In one embodiment of the invention, as depicted in FIG. 4, the primary support 26 is parallel to the floor 16. However, in other embodiments, where the primary support 26 is at a slight angle to the floor 16 in the second position, while there may be some short portions of the primary support 26 where the primary support bottom surface 42 may be closer to the floor 16 than the primary support top surface 42, the overall aggregate of the distance of the whole primary support bottom surface 42 from the floor 16 will be further from the floor 16 than the overall aggregate distance of the primary support top surface 32 from the floor 16 in the second position.

As used herein, the term "primary support top surface facing the floor" refers to the whole primary support top surface 32 being closer to the floor 16 than the whole primary support bottom surface 42, with the primary support 26 being substantially parallel to or at a slight angle with the floor 16. In one embodiment of the invention, as depicted in FIG. 4, the primary support 26 is parallel to the floor 16. However, in other embodiments, where the primary support 26 is at a slight angle to the floor 16 in the second position, while there may be some short portions of the primary support 26 where the primary support bottom surface 42 may be closer to the floor 16 than the primary support top surface 42, the overall aggregate of the distance of the whole primary support bottom surface 42 from the floor 16 will be further from the floor 16 than the overall aggregate distance of the primary support top surface 32 from the floor 16 with the primary support top surface 32 facing the floor 16.

As used herein, the term "primary support bottom surface facing the floor" refers to the whole primary support bottom surface 42 being closer to the floor 16 than the whole primary support top surface 32, with the primary support 26 being substantially parallel to or at a slight angle with the floor 16. In one embodiment of the invention, as depicted in FIG. 2, the primary support 26 is parallel to the floor 16. However, in other embodiments, where the primary support 26 is at a slight angle to the floor 16 in the first position, while there may be some short portions of the primary support 26 where the primary support bottom surface 42 may be further from the floor 16 than the primary support top surface 42, the overall aggregate of the distance of the whole primary support top surface 32 from the floor 16 will be further from the floor 16 than the overall aggregate distance of the primary support bottom surface 42 from the floor 16 with the primary support bottom surface 42 facing the floor 16.

As used herein, the term "primary support bottom surface orthogonal to the floor or at an angle greater than 0 degrees to the floor" refers to the primary support bottom surface 42 being positioned generally perpendicular to the floor 16, or at an angle greater than 0 degrees but less than 180 degrees to the floor 16. For example, the primary support bottom surface 42 in FIG. 5 is depicted as being orthogonal to or at approximately 90 degrees to both the floor 16 and the second support top surface 50. In this configuration, it is contemplated that the primary support 26 may serve as the back rest to the second support 44. However, it is also contemplated that the angle between the primary support bottom surface 42 and both the floor 16 and the second support top surface 50 may be greater than 0 degrees but less than 90 degrees, including but not limited to 45 degrees or 75 degrees, for example. The angle between the primary support bottom surface 42 and both the floor 16 and the second support top surface 50 may also be obtuse, including but not limited to 125 degrees and 150 degrees, for example. It is further contemplated that in another embodiment, the range of motion of the primary support 26 could be limited by some form of stopper. For example, the primary support bottom surface 42 may only be able to move within a narrow range of positions with the floor 16, between 60 degrees and 90 degrees, for example.

As used herein, the term "primary support top surface orthogonal to the floor or facing away from the floor at an angle greater than 0 degrees but less than 90 degrees to the floor" refers to the primary support top surface 32 being positioned generally perpendicular to the floor 16, or it refers to the whole primary support top surface 32 being further from the floor 16 than the whole primary support bottom surface 42 between 0 degrees and 90 degrees. In the embodiment in FIG. 6, the primary support top surface 32 is further from the floor 16 than the whole primary support bottom surface 42 at approximately 45 degrees.

As used herein, the term "proximate to the first post first end" means being positioned adjacent to a portion of the first post 18 above the first post body 22 and the first post second end 24, with the first post body 22 disposed between the first post first end 20 and the first post second end 24.

As used herein, the term "proximate to the first post body" means being positioned adjacent to a portion of the first post 18 below the first post first end 20 and above the first post second end 24, with the first post body 22 disposed between the first post first end 20 and the first post second end 24. As used herein, the term "proximate to the first post second end" means being positioned adjacent to a portion of the first post 18 below the first post first end 20 and the first post body 22, with the first post body 22 disposed between the first post first end 20 and the first post second end 24.

As used herein, the term "proximate to the first post second end" means being positioned adjacent to a portion of the first post 18 below the first post first end 20 and the first post body 22, with the first post body 22 disposed between the first post first end 20 and the first post second end 24.

As used herein, the term "proximate to the second post first end" means being positioned adjacent to a portion of the second post 124 above the second post body 152 and the second post second end 154, with the second post body 152 disposed between the second post first end 150 and the second post second end 154.

As used herein, the term "proximate to the second post body" means being positioned adjacent to a portion of the second post 124 below the second post first end 150 and above the second post second end 154, with the second post body 152 disposed between the second post first end 150 and the second post second end 154.

As used herein, the term "proximate to the second post second end" means being positioned adjacent to a portion of the second post 124 below the second post first end 150 and the second post body 152, with the second post body 152 disposed between the second post first end 150 and the second post second end 154.

FIG. 1 depicts an embodiment of the vehicle furniture system 10 with the primary support 26 being disposed in a first position proximate to the first post first end 20 with the primary support top surface 32 facing away from the floor 16. FIG. 2 also depicts a side view of the primary support 26 used as a "table top" in the first position, with the vehicle furniture system 10 shown to be proximate to a driver's seat 12 of a commercial cargo truck, pick-up truck, or similar vehicle 14. In the first position, the primary support may be used as a "table top" for eating a meal, reading, playing cards, reviewing a map, or other activity requiring an elevated support surface. The user may be comfortably seated on the second support 44 or on the third support 128 in close proximity to the primary support 26. This configuration uniquely enables the driver of a commercial cargo truck or pick-up truck on a lengthy trip to not have to sacrifice added time and expense searching for and spending money in a restaurant to have a comfortable sit-down meal, for example.

In another embodiment of the vehicle furniture system 10, the primary support 26 may be substantially parallel to the floor 16 in the first position. The first post 18 may be mountable to the floor 16 by a first post floor mount 62.

Still referring to FIG. 1, an embodiment of the vehicle furniture system 10 may include a second post 124 sized and configured to be mountable to the floor 16. The second post 124 may have a second post first end 150, a second post body 152, and a second post second end 154 mountable to the floor 16. The second post body 152 may be disposed between the second post first end 150 and the second post second end 154. The primary support rod 68 may span the distance of the primary support 26 and be engageable to both the first post 18 and the second post 124. The second post 124 may be mountable to the floor 16 by a second post floor mount 126.

Figures 7, 8:
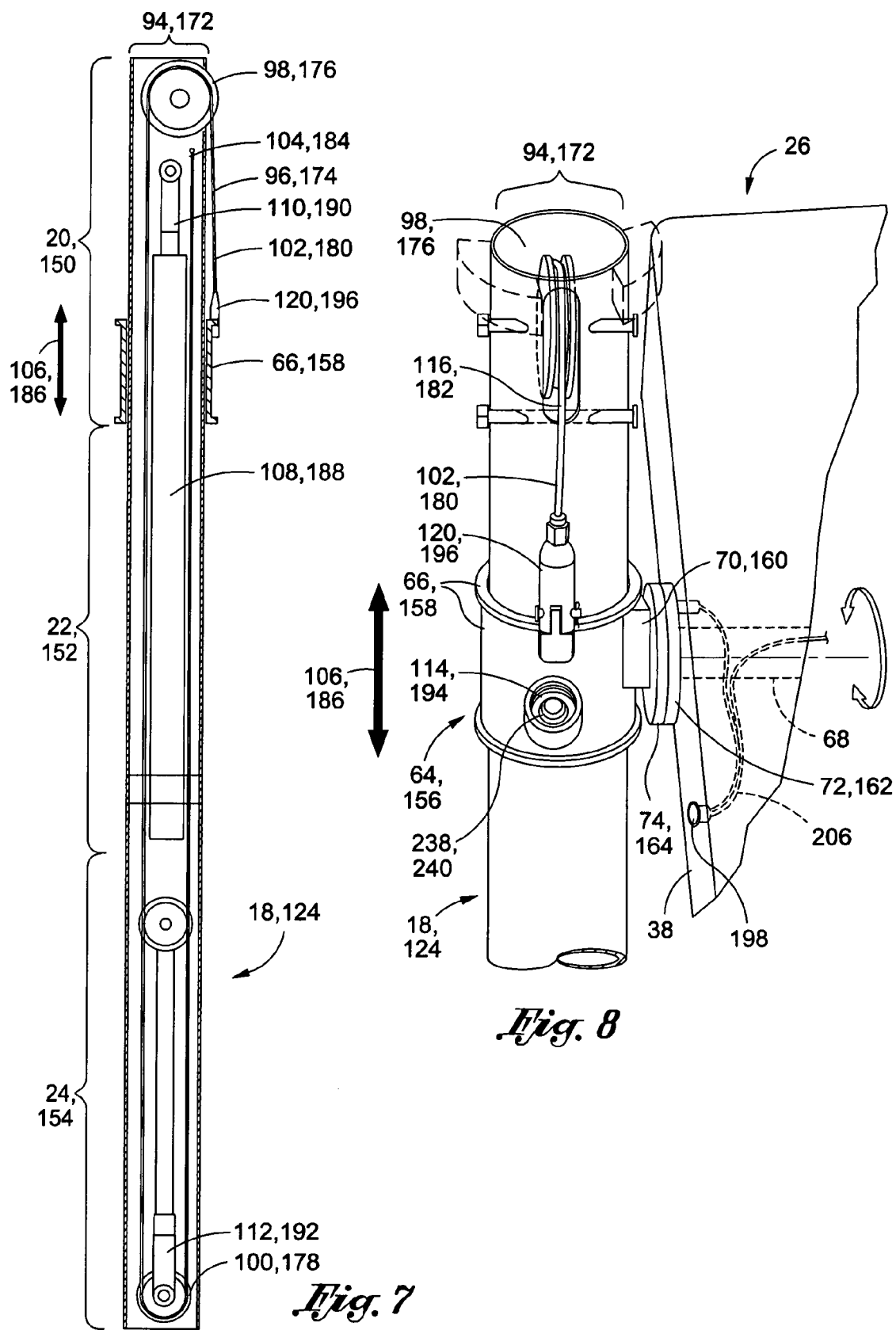
FIG. 7 is an exploded view of the interior of the first post and the second post operative to slidably engage the primary support along the first post axis and the second post axis, respectively.
FIG. 8 is an exploded view of the first post assembly, the second post assembly, the first post mount, and the second post mount operative to slidably position the primary support along the first post axis, and rotatably dispose the primary support about the primary support rod.

In the embodiment of the vehicle furniture system 10 depicted in FIGS. 1 and 8, the primary support first lateral side 38 may be rotatably engageable to the first post 18 by a first post mount 64. In another embodiment, a first post locking pin 114 may be mountable to the first post mount 64, operative to aid in locking the position of the primary support 26 along a first post axis 106 of the first post 18 is shown facing the third support 128 in the embodiment depicted in FIG. 1. Still referring to FIGS. 1 and 8, in another embodiment, a second post locking pin 194 may be mountable to a second post mount 156 operative to lock the position of the primary support 26 along a second post axis 186 of the second post 124. In yet other embodiments, the first post locking pin 114 and/or the second post locking pin 194 may be spring-loaded. In these embodiments, a first post locking pin spring 238 proximate to the first post locking pin 114 may enable the primary support 26 to be locked into a desired position along the first post axis 106, with the first post locking pin 194 turned for example in a clock-wise direction. A second post locking pin spring 240 proximate to the second post locking pin 194 may enable the primary support 26 to be locked into a desired position along the second post axis 186, with the second post locking pin 194 turned for example in a clock-wise direction.

Referring still to the embodiment depicted in FIG. 8, the first post mount 64 may have a first post collar 66 disposable around the first post 18. The first post mount 64 may also have a first post collar bracket 70 proximate to the first post collar 66, a first post primary ring 72 disposed adjacent to the primary support second lateral side 60, and an opposing first post secondary ring 74 disposed against the first post collar bracket 70. In another embodiment, the second post mount 156 of the second post 124 may have a second post collar 158 disposable around the second post 124. The second post mount 156 may also have a second post collar bracket 160 proximate to the second post collar 158, a second post primary ring 162 disposed adjacent to the primary support first lateral side 38, and an opposing second post secondary ring 164 disposed against the second post collar bracket 160. In the embodiment depicted in FIG. 1, the primary support 26 is disposed in the first position with the first post mount 64 proximate to the first post first end 20. The second post mount 156 is proximate to the second post first end 150.

Figure 9:
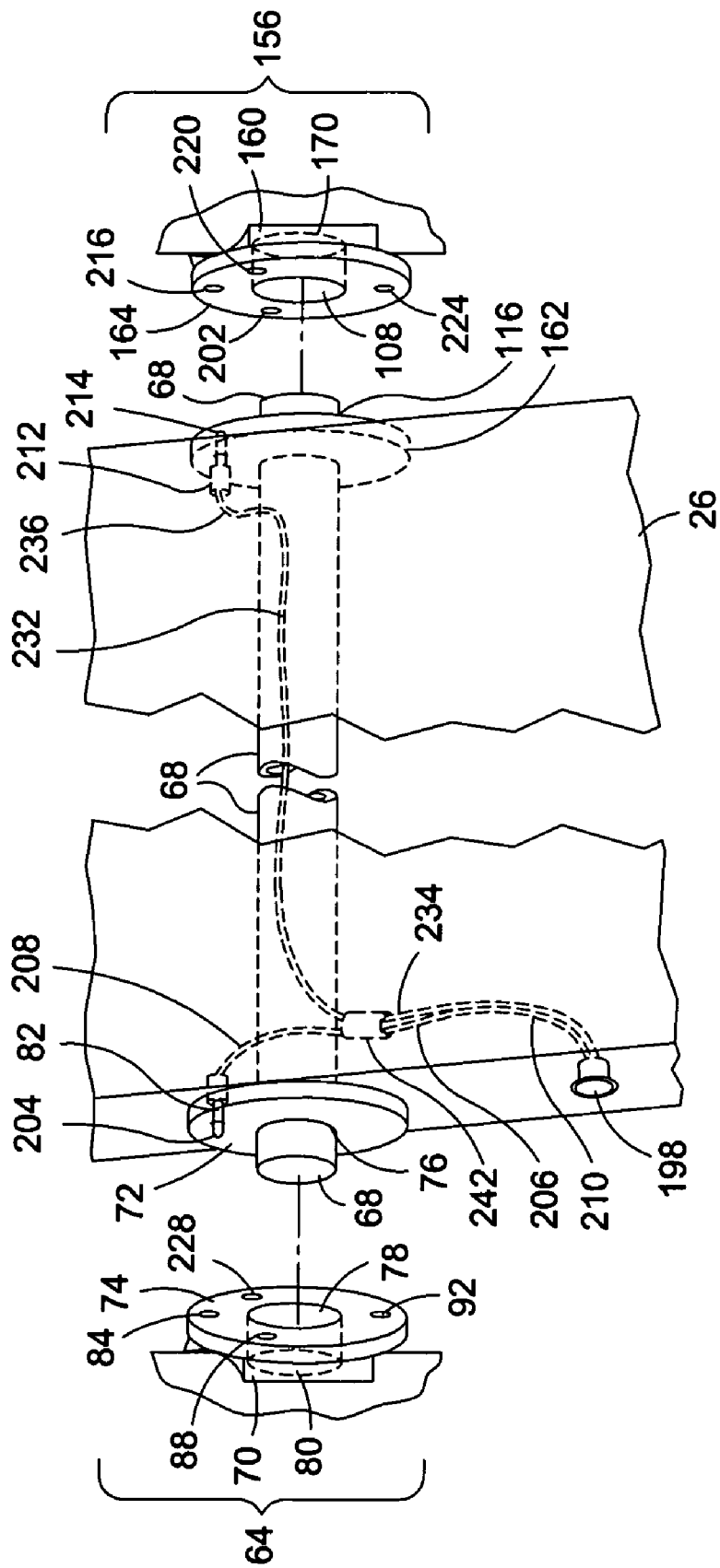
FIG. 9 is an exploded view of the first post mount and the second post mount.

Referring to FIG. 9, the primary support rod 68 may be disposable through a first post primary ring aperture 76 on the first post primary ring 72. The primary support rod 68 may also be disposable through a first post secondary ring aperture 78 on the first post secondary ring 74. The primary support rod 68 may be further engageable and axially rotatable with the first post collar bracket 70 through a collar bracket aperture 80. The primary support rod 68 may also be disposable through a second post primary ring aperture 166 on the second post primary ring 162. The primary support rod 68 may also be disposable through a second post secondary ring aperture 168 on the second post secondary ring 164. The primary support rod 68 may be further engageable and axially rotatable with the second post collar bracket 160 through a second post collar bracket aperture 170. This configuration of the vehicle furniture system 10 uniquely enables the primary support 26 to be readily convertible between the dining, sitting, and sleeping modes.

Referring again to FIG. 8, the embodiment of the vehicle furniture system 10 includes the first post locking pin 114 being mountable to the first post collar 66 operative to lock the position of the primary support 26 along the first post axis 106 when turned for example in a clockwise direction. Accordingly, this feature of the vehicle furniture system 10 uniquely enables the primary support 26 to be slidably engaged between the first post first end 20 and the first post second end 24. The vehicle furniture system 10 may therefore be readily converted and conveniently deployed in its various positions in the table top, sitting, and sleeping modes.

In an embodiment having a second post 124, the vehicle furniture system 10 may also include the second post locking pin 194 mountable to the second post collar 158 operative to lock the position of the primary support 26 along the second post axis 186 when turned for example in a clockwise direction.

Referring again to FIG. 9, an embodiment of the vehicle furniture system 10 may further include a first post positioning pin 204 disposable through a first post primary ring slot 82 on the first post primary ring 72. The first post positioning pin 204 may be further engageable with a plurality of first post secondary ring slots on the first post secondary ring 74. The primary support 26 may be axially rotatable about the primary support rod 68 and engageable in the first position with the first positioning pin 204 being disposable through the first post primary ring slot 82 and engageable with a first post secondary ring first slot 84. The primary support 26 may be axially rotatable about the primary support rod 68 and engageable in the second position with the first post positioning pin 204 being disposable through the first post primary ring slot 82 and engageable with a first post secondary ring second slot 88. The primary support 26 may be axially rotatable about the primary support rod 68 and engageable in the third position with the first post positioning pin 204 being disposable in the first post primary ring slot 82 and engageable with a first post secondary ring third slot 92. The primary support 26 may be axially rotatable about the primary support rod 68 and engageable in the fourth position with the first post positioning pin 204 being disposable in the first post primary ring slot 82 and engageable with a first post secondary ring fourth slot 202. In yet other embodiments, the first post positioning pin 204 and/or the second post positioning pin 212 may be spring-loaded.

In another embodiment, a second post positioning pin 212 may be disposable through a second post primary ring slot 214 on the second post primary ring 162. The second post positioning pin 212 may be further engageable with a plurality of second post secondary ring slots on the second post secondary ring 164. The primary support 26 may be axially rotatable about the primary support rod 68 and engageable in the first position with the second post positioning pin 212 being disposable through the second post primary ring slot 214 and engageable with a second post secondary ring first slot 216. The primary support 26 may be axially rotatable about the primary support rod 68 and engageable in the second position with the second post positioning pin 212 being disposable through the second post primary ring slot 214 and engageable with a second post secondary ring second slot 220. The primary support 26 may be axially rotatable about the primary support rod 68 and engageable in the third position with the second post positioning pin 212 being disposable in the second post primary ring slot 214 and engageable with a second post secondary ring third slot 224. The primary support 26 may be axially rotatable about the primary support rod 68 and engageable in the fourth position with the second post positioning pin 212 being disposable in the second post primary ring slot 214 and engageable with a second post secondary ring fourth slot 228.

As discussed above, this configuration of the vehicle furniture system 10 is innovative in that it enables the primary support 26 to be readily convertible into one of its various positions in the table top mode, bed mode, or seat mode.

As depicted in FIG. 9, another embodiment of the vehicle furniture system 10 may further include a first post positioning pin cable 206. The first post positioning pin cable 206 may have a first post positioning pin cable first end 208 and a first post positioning pin cable second end 210. The first post positioning pin cable first end 208 may be engageable to the first post positioning pin 204. The first post positioning pin cable second end 210 may be engageable to a positioning button 198 disposable on the primary support 26. The positioning button 198 is shown in the embodiments of FIGS. 1-6, 8-9 as disposed on the primary support lateral side 38. However, the positioning button 198 may also be disposed in another location on the primary support 26, for example on the primary support second side 40. Alternatively, there may be more than one positioning button 198 on the primary support 26. The first post positioning pin cable 206 may release the first post positioning pin 204 through the first post primary ring slot 82 and engage one of the first post secondary ring slots when the positioning button 198 is released. In this configuration, the primary support 26 may be locked into one of the desired first, second, third, or fourth positions, thereby preventing the primary support 26 from being freely rotatable about the primary support rod 68. The first post positioning pin cable 206 may retract the first post positioning pin 204 from the first post primary ring slot 82 and one of the plurality of first post secondary ring slots when the positioning button 198 is depressed. In this configuration, the primary support 26 is freely rotatable about the primary support rod 68, thereby enabling the vehicle furniture system 10 to be readily convertible between the first, second, third, and fourth positions. As such, this feature enables the vehicle furniture system 10 to be readily converted and conveniently deployed between the table top, sitting and sleeping modes by the simple depression or release of the positioning button 198.

In an embodiment including the second post 124, the vehicle furniture system 10 may further include a second post positioning pin cable 232. The second post positioning cable 232 may have a second post positioning pin cable first end 234 and a second post positioning pin cable second end 236. The second post positioning pin cable first end 234 may be engageable to the second post positioning pin 212. The second post positioning pin cable second end 236 may be engageable to the positioning button 198. The second post positioning pin cable 232 may release the second post positioning pin 212 through the second post primary ring slot 214 and engage one of the plurality of second post secondary ring slots when the positioning button 198 is released. The second post positioning pin cable 232 may retract the second post positioning pin 212 from the second post primary ring slot 214 and one of the plurality of second post secondary ring slots when the positioning button 198 is depressed.

Referring to FIG. 9, in yet other embodiments, the first post positioning pin 204 and/or the second post positioning pin 212 may be spring-loaded. In these embodiments, a positioning pin spring 242 proximate to the positioning button 198 and disposable to the first post positioning pin cable 206 may enable the first post positioning pin cable 206 to release the first post positioning pin 204 through the first post primary ring slot 82 and engage one of the first post secondary ring slots. In this configuration, the positioning pin spring 242 may be compressed when the positioning button 198 is released. Alternatively, with the positioning button 198 depressed, the positioning pin spring 242 may enable the first post positioning pin cable 206 to retract the first post positioning pin 204 from the first post primary ring slot 82 and one of the plurality of first post secondary ring slots. In this configuration, the positioning pin spring 242 may be relaxed when the positioning pin is depressed. Accordingly, the positioning pin spring 242 may enable the primary support 26 to be raised or lowered and locked or unlocked along the length of the first post axis 106 of the first post 18. Likewise, in another embodiment, the positioning pin spring 242 may be connectable to the second post positioning pin cable 232 and may enable the second post positioning pin cable 232 to release or retract the second post positioning pin 212 from the second post primary ring slot 214 and the second post secondary ring slots, depending on whether the positioning button 198 is released or depressed. In this configuration, the positioning pin spring 242 may enable the primary support 26 to be raised or lowered and locked or unlocked along the length of the second post axis 186 of the second post 124.

Referring to FIGS. 7 and 8, an embodiment of the vehicle furniture system 10 may include a first post assembly 94 having a first post cable 96, a first post primary pulley 98 proximate to the first post first end 20, and a first post secondary pulley 100 proximate to the first post second end 24. The first post cable 96 may be disposable around the first post primary pulley 98 and the first post secondary pulley 100. The first post cable 96 may have a first post cable first end 102 engageable to the first post collar 66 at a first post cable first end collar lock 120. The first post cable first end 102 passes through a first post first end aperture 116 on the first post first end 20, as shown in FIG. 8. The first post cable 96 may further have a first post cable second end 104 disposable on the first post primary pulley 98 operative to slidably move the primary support 26 along a first post axis 106. The first post assembly 94 may further include a first post suspension 108 having a first post suspension first end 110 and a first post suspension second end 112. The first post suspension first end 110 may be engageable with the first post primary pulley 98. The first post suspension second end 112 may be engageable with the first post secondary pulley 100. Upon compression, the first post suspension 108 may be operative to adjust the position of the primary support 26 along the first post axis 106. As discussed above, once a desired position is selected, the first post locking pin 114 may be operative to fix the primary support 26 in a desired position along the length of the first post axis 106 of the first post 18.

In an embodiment including the second post 124, the vehicle furniture system 10 may also include a second post assembly 172 having a second post cable 174, a second post primary pulley 176 proximate to a second post first end 150, and a second post secondary pulley 178 proximate to a second post second end 154. The second post cable 174 may be disposable around the second post primary pulley 176 and the second post secondary pulley 178. The second post cable 174 may have a second post cable first end 180 engageable to the second post collar 158 through a second post first end aperture 182 on the second post first end 150, as shown in FIG. 8. The second post cable 174 may have a second post cable first end 180 engageable to the second post collar 158 at a second post cable first end collar lock 196. The second post cable first end 180 passes through a second post first end aperture 182. The second post cable 174 may further have a second post cable second end 184 disposable on the second post primary pulley 176 operative to slidably move the primary support 26 along a second post axis 186. The second post assembly 172 may further include a second post suspension 188 having a second post suspension first end 190 and a second post suspension second end 192. The second post suspension first end 190 may be engageable with the second post primary pulley 176. The second post suspension second end 192 may be engageable with the second post secondary pulley 178. Upon compression, the second post suspension 188 may be operative to position the primary support 26 along the second post axis 186. The second post locking pin 194 may be operative to fix the primary support 26 in a desired position along the second post axis 186 of the second post 124.

FIG. 3 is an embodiment of the vehicle furniture system 12 with the primary support 26 disposed in a second position with the first post mount 64 proximate to the first post second end 24 and the second post mount 156 proximate to the second post second end 154. In this embodiment, the primary support bottom surface 42 may face away from the floor 16. The second support second longitudinal side 54 may be generally coplanar and adjacent to the primary support second longitudinal side 36 of the primary support 26. The third support first longitudinal side 138 of the third support 128 may be generally coplanar and adjacent to the primary support first longitudinal side 34. In this second position, the vehicle furniture system 10 may be used as a bed for rest and relaxation. This configuration of the vehicle furniture system 10 uniquely enables the driver of a commercial cargo truck or pick-up truck on a lengthy trip to not have to sacrifice added time and expense searching for and spending money on a hotel to be able to comfortably sleep in a bed, for example. This comfort level is enhanced in an embodiment of the vehicle furniture system 10 where the primary support bottom surface 42 is made of a padded material. The second support top surface 50 and the third support top surface 134 may likewise be made of a padded material for further cushioning. This is distinguishable from the primary support 26 being in the first position, where the primary support top surface 32 may be made of a hard material for use as a table-top.

FIG. 4 depicts a side-view of an embodiment of the vehicle furniture system 10 with the primary support 26 forming a bed in the second position, with the second support 44 and the third support 128 proximate to the driver's seat 12 of a commercial cargo truck, pick-up truck or similar vehicle 14.

FIG. 5 is an embodiment of the vehicle furniture system 10 with the primary support 26 disposed in a third position, with the first post mount 64 proximate to the first post body 22 and the second post mount 156 proximate to the second post body 152. As discussed above, in this embodiment, the primary support bottom surface 42 may be orthogonal to the floor 16 or at an angle greater than 0 degrees but less than 180 degrees to the floor 16. In the embodiment in FIG. 5, with the primary support 26 in the third position, the primary support 26 may be adjacent and generally perpendicular to the second support 44. In this configuration, the primary support 26, the second support 44, and the third support 128, with the third support back rest 148 generally perpendicular to the third support 128, may be used as additional seats proximate to the driver's seat 12 of a commercial cargo truck or pick-up truck.

FIG. 6 is a side view of an embodiment of the vehicle furniture system 10 depicting the primary support 26 in the fourth position, with the first post mount 64 proximate to the first post first end 20 and the second post mount 156 proximate to the second post first end 150. As discussed above, in this embodiment, the primary support top surface 32 may be orthogonal to the floor 16 or facing away from the floor 16 at an angle greater than 0 degrees but less than 90 degrees to the floor 16. The driver's seat 12 of a commercial cargo truck, pick-up truck, or similar vehicle 14 is shown proximate to the vehicle furniture system 10. This configuration uniquely enables the vehicle furniture system 10 to be used for painting, viewing maps, and related tasks while seated on the third support 128, with the third support back rest 148 providing added comfort to the third support 128.

What is claimed is:

1. A multipurpose vehicle furniture system for use proximate to a driver's seat in a vehicle, the vehicle having a floor, the multipurpose furniture system comprising:

a first post including a first post first end, a first post body, and a first post second end sized and configured to be mountable to the floor, the first post body disposed between the first post first end and the first post second end;

a primary support defining a primary support longitudinal axis and a primary support lateral axis disposed perpendicular to the primary support longitudinal axis, the primary support having a primary support top surface and an opposing primary support bottom surface, a primary support first longitudinal side, a primary support second longitudinal side opposing the primary support first longitudinal side, a primary support first lateral side, and a primary support second lateral side opposing the primary support first lateral side, the primary support first lateral side and the primary support second lateral side disposed generally between the primary support first longitudinal side and the primary support second longitudinal side, each of the primary support first longitudinal side, the primary support second longitudinal side, the primary support first lateral side, and the primary support second lateral side disposed between the primary support top surface and the primary support bottom surface, the primary support first longitudinal side being rotatably and slidably engaged to the first post, the primary support being disposable in a first position proximate to the first post first end with the primary support top surface facing away from the floor, the primary support being disposable in a second position proximate to the first post second end with the primary support bottom surface facing away from the floor, the primary support being disposable in a third position proximate to the first post body with the primary support bottom surface orthogonal to the floor or at an angle greater than 0 degrees to the floor, and the primary support being disposable in a fourth position proximate to the first post first end with the primary support top surface orthogonal to the floor or facing away from the floor at an angle greater than 0 degrees but less than 90 degrees to the floor;

a primary support rod disposable proximate to the primary support and engageable with the first post, the primary support being axially rotatable about the primary support rod; and a second support mountable to the floor, the second support defining a second support longitudinal axis and a second support lateral axis disposed perpendicular to the second support longitudinal axis, the second support having a second support top surface and an opposing second support bottom surface, a second support first longitudinal side, a second support second longitudinal side opposing the second support first longitudinal side, a second support first lateral side, and a second support second lateral side opposing the second support first lateral side, the second support first lateral side and the second support second lateral side disposed generally between the second support first longitudinal side and the second support second longitudinal side, each of the second support first longitudinal side, the second support second longitudinal side, the second support first lateral side, and the second support second lateral side disposed between the second support top surface and the second support bottom surface, the second support second longitudinal side being generally coplanar and adjacent to the primary support second longitudinal side with the primary support in the second position, the second support being adjacent to the primary support with the primary support in the third position.

2. The system as claimed in claim 1, wherein the primary support is substantially parallel to the floor in the first position.

3. The system as claimed in claim 1 further includes a first post floor mount operative to mount the first post to the floor.

4. The system as claimed in claim 1 further includes a first post mount, the primary support second lateral side being rotatably engageable to the first post by the first post mount, the first post mount having a first post collar disposable around the first post, a first post collar bracket proximate to the first post collar having a first post collar bracket aperture, a first post primary ring disposable adjacent to the primary support second lateral side having a first post primary ring aperture, and a first post secondary ring opposing the first post primary ring disposable against the first post collar bracket having a first post secondary ring aperture, the primary support rod being disposable through the first post primary ring aperture and the first post secondary ring aperture, the primary support rod being further engageable and axially rotatable in the first post collar bracket aperture.

5. The system as claimed in claim 4 further includes a first post positioning pin disposable through a first post primary ring slot on the first post primary ring, the first post positioning pin being further engageable with a plurality of first post secondary ring slots on the first post secondary ring, the primary support being axially rotatable about the primary support rod and engageable in the first position with the first post positioning pin being disposable through the first post primary ring slot and engageable with a first post secondary ring first slot, the primary support being axially rotatable about the primary support rod and engageable in the second position with the first post positioning pin being disposable through the first post primary ring slot and engageable with a first post secondary ring second slot, the primary support being axially rotatable about the primary support rod and engageable in the third position with the first post positioning pin being disposable in the first post primary ring slot and engageable with a first post secondary ring third slot, the primary support being axially rotatable about the primary support rod and engageable in the fourth position with the first post positioning pin being disposable in the first post primary ring slot and engageable with a first post secondary ring fourth slot.

6. The system as claimed in claim 5 further includes a first post positioning pin cable having a first post positioning pin cable first end and a first post positioning pin cable second end, the first post positioning pin cable first end being engageable to the first post positioning pin, the first post positioning pin cable second end being engageable to a positioning button disposable on the primary support, the first post positioning pin cable operative to release the first post positioning pin through the first post primary ring slot and engage one of the plurality of first post secondary ring slots when the first post positioning button is released, the first post positioning pin cable further operative to retract the first post positioning pin from the first post primary ring slot and one of the plurality of first post secondary ring slots when the positioning button is depressed.

7. The system as claimed in claim 4 further includes a first post assembly, the first post assembly including a first post cable operative to slidably move the primary support along a first post axis of the first post, a first post primary pulley proximate to the first post first end, and a first post secondary pulley proximate to the first post second end, the first post cable being disposable around the first post primary pulley and the first post secondary pulley, the first post cable having a first post cable first end engageable to the first post collar through a first post first end aperture on the first post first end, the first post cable further having a first post cable second end disposable on the first post primary pulley, the first post assembly further including a first post suspension having a first post suspension first end and a first post suspension second end operative to position the primary support along the first post axis, the first post suspension first end being engageable with the first post primary pulley, the first post suspension second end being engageable with the first post secondary pulley.

8. The system as claimed in claim 4 further includes a first post locking pin mountable to the first post collar operative to lock the position of the primary support along the first post axis to the first post.

9. The system as claimed in claim 4 further includes a first post cable first end collar lock operative to engage the first post cable first end to the first post collar.

10. The system as claimed in claim 1 further includes a second post, the second post having a second post first end, a second post body, and a second post second end sized and configured to be mountable to the floor, the second post body disposed between the second post first end and the second post second end.

11. The system as claimed in claim 10 further includes a second post floor mount operative to mount the second post to the floor.

12. The system as claimed in claim 10 further includes a second post mount, the primary support first lateral side being rotatably engageable to the second post by the second post mount, the second post mount having a second post collar disposable around the second post, a second post collar bracket proximate to the second post collar having a second post collar bracket aperture, a second post primary ring disposable adjacent to the primary support first lateral side having a second post primary ring aperture, a second post secondary ring opposing the second post primary ring disposable against the second post collar bracket having a second post secondary ring aperture, the primary support rod being disposable through the second post primary ring aperture and the second post secondary ring aperture, the primary support rod being further engageable and axially rotatable in the second post collar bracket aperture.

13. The system as claimed in claim 12 further includes a second post positioning pin disposable through a second post primary ring slot on the second post primary ring, the second post positioning pin being further engageable with a plurality of second post secondary ring slots on the second post secondary ring, the primary support being axially rotatable about the primary support rod and engageable in the first position with the second post positioning pin being disposable through the second post primary ring slot and engageable with a second post secondary ring first slot, the primary support being axially rotatable about the primary support rod and engageable in the second position with the second post positioning pin being disposable through the second post primary ring slot and engageable with a second post secondary ring second slot, the primary support being axially rotatable about the primary support rod in the third position with the second post positioning pin being disposable through the second post primary ring slot and engageable with a second post secondary ring third slot, the primary support being axially rotatable about the primary support rod and engageable in the fourth position with the second post positioning pin being disposable through the second post primary ring slot and engageable with a second post secondary ring fourth slot.

14. The system as claimed in claim 13 further includes a second post positioning pin cable having a second post positioning pin cable first end and a second post positioning pin cable second end, the second post positioning pin cable first end being engageable to the second post positioning pin, the second post positioning pin cable second end being engageable to a positioning button disposable on the primary support, the second post positioning pin cable operative to release the second post positioning pin through the second post primary ring slot and engage one of the plurality of second post secondary ring slots when the second post positioning button is released, the second post positioning pin cable further operative to retract the second post positioning pin from the second post primary ring slot and one of the plurality of second post secondary ring slots when the positioning button is depressed.

15. The system as claimed in claim 12 further includes a second post assembly, the second post assembly having a second post cable operative to slidably move the primary support along a second post axis of the second post, a second post primary pulley proximate to the second post first end, and a second post secondary pulley proximate to the second post second end, the second post cable being disposable around the second post primary pulley and the second post secondary pulley, the second post cable having a second post cable first end engageable to the second post collar through a second post first end aperture on the second post first end, the second post cable further having a second post cable second end disposable on the second post primary pulley, the second post assembly further including a second post suspension having a second post suspension first end and a second post suspension second end operative to position the primary support along the second post axis, the second post suspension first end being engageable with the second post primary pulley, the second post suspension second end being engageable with the second post secondary pulley.

16. The system as claimed in claim 12 further includes a second post locking pin mountable to the second post collar operative to lock the position of the primary support along the second post axis to the second post.

17. The system as claimed in claim 12 further includes a second post cable first end collar lock operative to engage the second post cable first end to the second post collar.

18. The system as claimed in claim 1 further includes a third support mountable to the floor, the third support defining a third support longitudinal axis and a third support lateral axis disposed perpendicular to the third support longitudinal axis, the third support having a third support top surface and an opposing third support bottom surface, a third support first longitudinal side, a third support second longitudinal side opposing the third support first longitudinal side, a third support first lateral side, and a third support second lateral side opposing the third support first lateral side, the third support first lateral side and the third support second lateral side disposed generally between the third support first longitudinal side and the third support second longitudinal side, each of the third support first longitudinal side, the third support second longitudinal side, the third support first lateral side, and the third support second lateral side disposed between the third support top surface and the third support bottom surface, the third support first longitudinal side being generally coplanar and adjacent to the primary support first longitudinal side with the primary support in the second position.

19. The system as claimed in claim 18 further includes a third support back rest disposable proximate to the third support, the third support back rest being generally perpendicular to the third support.

20. The system as claimed in claim 19 further includes a hinge connectable to the third support and the third support back rest, the hinge being operative to make the third support and the third support back rest foldable.

* * * * *